US007047339B2

(12) United States Patent
Oakley

(10) Patent No.: US 7,047,339 B2
(45) Date of Patent: May 16, 2006

(54) COMPUTER SYSTEM WITH DETACHABLE ALWAYS-ON PORTABLE DEVICE

(75) Inventor: Nicholas W. Oakley, Portland, OR (US)

(73) Assignee: Intel Corporation, Santa Clara, CA (US)

(*) Notice: Subject to any disclaimer, the term of this patent is extended or adjusted under 35 U.S.C. 154(b) by 235 days.

(21) Appl. No.: 10/608,695

(22) Filed: Jun. 27, 2003

(65) Prior Publication Data
US 2004/0268004 A1 Dec. 30, 2004

(51) Int. Cl.
G06F 13/00 (2006.01)
G06F 13/42 (2006.01)
G06F 1/26 (2006.01)
H04M 1/00 (2006.01)

(52) U.S. Cl. ............ 710/303; 710/105; 713/323; 345/156

(58) Field of Classification Search ........ 710/300–304, 710/105; 709/225, 230, 253; 713/300, 320, 713/324, 323; 361/683–686, 725–730; 340/286.02, 340/53; 379/93.17, 93.37; 455/566, 351, 455/575.1; 370/908; 345/156, 418
See application file for complete search history.

(56) References Cited

U.S. PATENT DOCUMENTS

| 3,819,862 | A | * | 6/1974 | Hedges ................... 379/93.37 |
| 5,323,291 | A | * | 6/1994 | Boyle et al. ............... 361/686 |
| 5,598,539 | A | * | 1/1997 | Gephardt et al. ........... 710/304 |
| 5,929,601 | A | * | 7/1999 | Kaib et al. ................. 320/113 |
| 6,349,221 | B1 | * | 2/2002 | Wolf et al. ................. 455/566 |
| 6,493,747 | B1 | * | 12/2002 | Simmon et al. ............ 709/208 |
| 6,848,058 | B1 | * | 1/2005 | Sinclair et al. ............. 713/322 |

OTHER PUBLICATIONS

"Battery modeling for energy aware system design" by Rao et al. (abstract only) Publication Date:Dec. 2003.*

* cited by examiner

Primary Examiner—Gopal C. Ray
(74) Attorney, Agent, or Firm—David N. Tran

(57) ABSTRACT

A computer system includes a primary display and a secondary display. The secondary display is coupled to a portable device. Information displayed on the secondary display includes information transmitted by the computer system via a short-range communication channel.

18 Claims, 8 Drawing Sheets

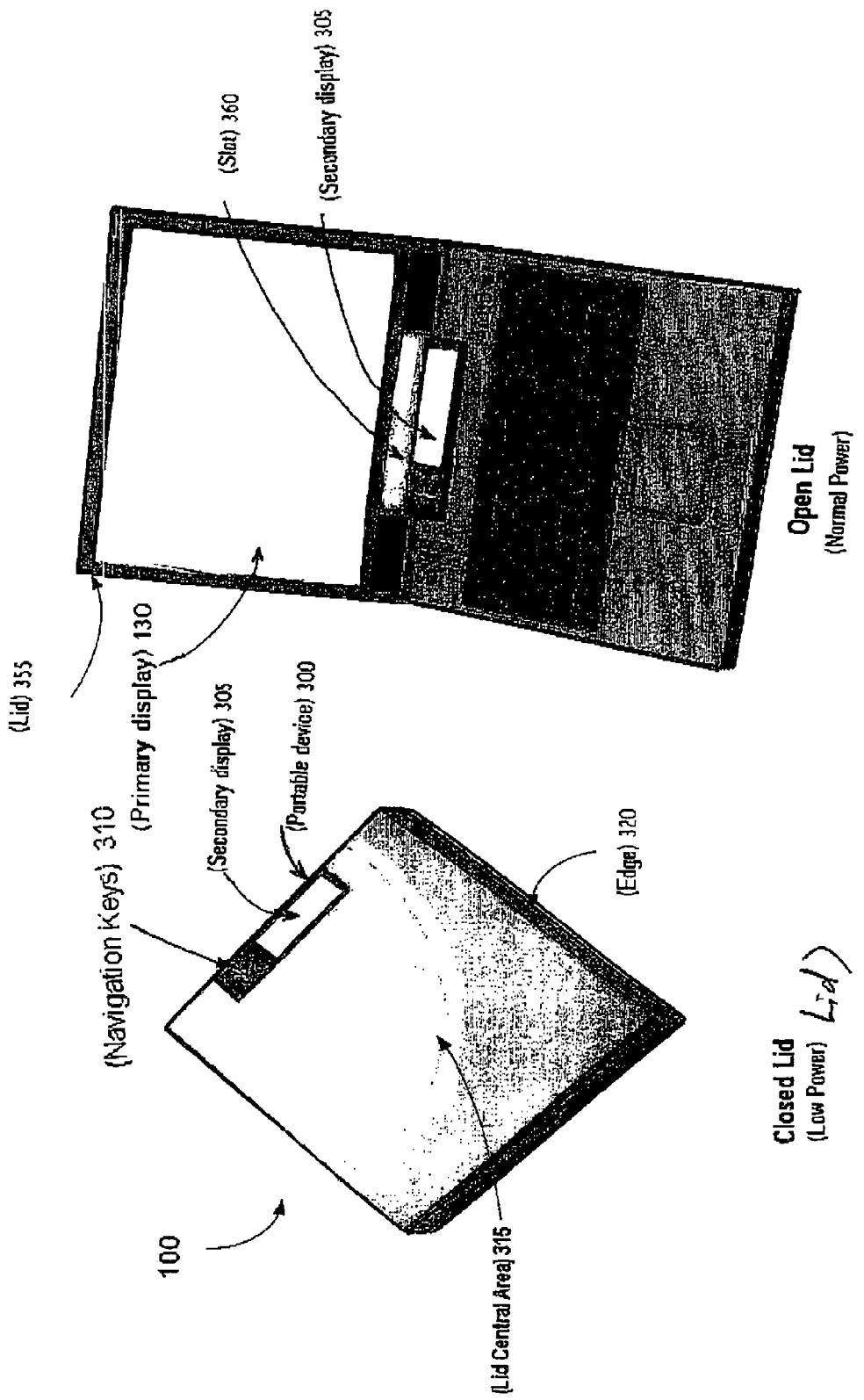

COMPUTER SYSTEM WITH DETACHABLE ALWAYS-ON PORTABLE DEVICE

FIELD OF THE INVENTION

This invention relates to computer systems, and more specifically to computer systems having a secondary interface.

BACKGROUND OF THE INVENTION

Computer systems, especially mobile computer systems, are becoming ever more popular today. Typically, mobile computer systems have a clam-shell form factor such that when a lid is open, a display and a keyboard are exposed. The user may power on the computer system and start an operating system (OS). The user may then initiate one or more applications such as, for example, electronic mail (email), appointment calendar, addresses book, etc. The computer system may need to be connected to a local area network (LAN) to receive up-to-date information.

In the fast pace of today society, it is becoming more important for the user to be able to receive up-to-date information while on the go. For example, a business traveler may have the needs to be able to read new email messages and to receive updated calendar appointments at any time. With the compact and thin design of mobile computer systems and the acceptance of wireless connectivity, the business traveler may no longer have to be constrained to an office to get the up-to-date information instead, with a wireless local area network (WLAN) adapter and an account, the business traveler may only need to be near a hot spot and be able to access the same information from virtually anywhere in the world.

Although the wireless connectivity arrangement provides the business traveler more flexibility in terms of location, it still however requires the business traveler to open the lid of the mobile computer system, start the application, etc. This may consume battery power. One major concern of using mobile computer systems is the ability to operate them for a long time using power provided by a battery. Different techniques have been developed to reduce power consumption and to enable longer battery life. This includes reducing processor and chipset clock speeds, disabling unused components, reducing power required by displays, etc.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 3A illustrates one example of a mobile computer system having a secondary display coupled to a portable device, according to one embodiment.

FIG. 3B illustrates one example of a mobile computer system having a slot in a lid section to accept a portable device having a secondary display, according to one embodiment.

DETAILED DESCRIPTION

Figure 1:
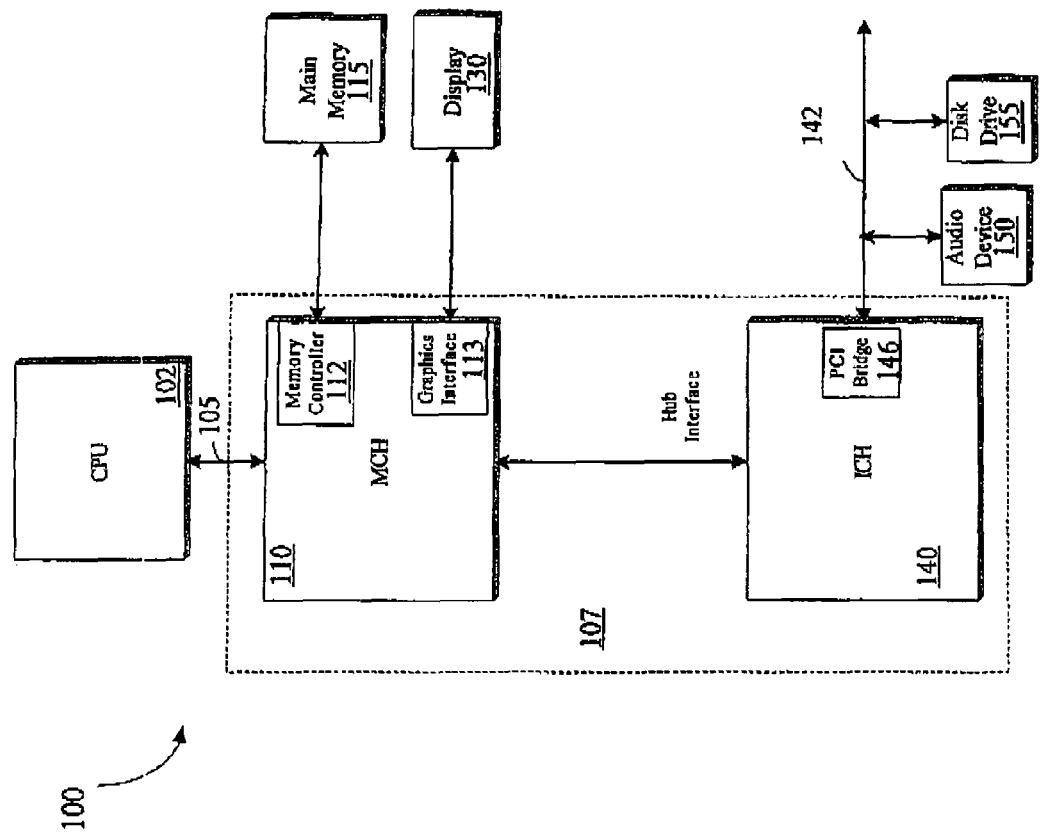
FIG. 1 is a block diagram illustrating an example of a computer system that may be used in accordance with one embodiment.

Embodiments of a mobile computer system having a primary display and a secondary display are disclosed. The secondary display may be coupled to a portable device. The secondary display may be visible when the mobile computer system is in a closed-lid state. When detached from the mobile computer system, the portable device may communicate with the mobile computer system via a short range communication channel.

In the following description, for purposes of explanation, specific nomenclature is set forth to provide a thorough understanding of the present invention. However, it will be apparent to one skilled in the art that these specific details are not required in order to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Computer System

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below.

FIG. 1 is a block diagram illustrating an example of a computer system that may be used in accordance with one embodiment. Computer system 100 may include a central processing unit (CPU) 102 and may receive its power from an electrical outlet or a battery. The CPU 102 may be coupled to a bus 105. The CPU 102 may be a processor manufactured by, for example, Intel Corporation of Santa Clara, Calif. Chipset 107 may be coupled to the bus 105. The chipset 107 may include a memory control hub (MCH) 110. The MCH 110 may include a memory controller 112 that is coupled to system memory 115 (e.g., random access memory (RAM), read-only memory (ROM), etc.). The system memory 115 may store data and sequences of instructions that are executed by the CPU 102 or any other processing devices included in the computer system 100.

The MCH 110 may include a graphics interface 113. A display 130 may be coupled to the graphics interface 113. Typically, the display 130 is a liquid crystal display (LCD). Other display technologies (e.g., organic light-emitting diode (OLED) display) may also be used. Although not shown, there may be logic to translate a digital representation of an image stored in a storage device such as video memory or system memory into display signals that may be interpreted and displayed by the display 130.

The chipset 107 may also include an input/output control hub (ICH) 140. The ICH 140 may be coupled with the MCH 110 via a hub interface. The ICH 140 may provide an interface to input/output (I/O) devices within the computer system 100. The ICH 140 may be coupled to a peripheral bus (e.g., Peripheral Component Interconnect (PCI) bus). Thus, the ICH 140 may include a PCI bridge 146 that provides an interface to a PCI bus 142. The PCI bridge 146 may provide a data path between the CPU 102 and peripheral devices. An audio device 150 and a disk drive 155 may be connected to the PCI bus 142. Although not shown, other devices (e.g., keyboard, mouse, etc.) may also be connected to the PCI bus 142.

For one embodiment, the computer system 100 may include one or more network adapters. For example, the computer system 100 may include a WLAN adapter (not shown) to allow it to establish a wireless network connection to a LAN via a hotspot (not shown). The computer system 100 may use the connection to the LAN to connect to the Internet (not shown). For one embodiment, the computer system 100 may also include a General Packet Radio Service (GPRS) adapter (not shown) to allow it to establish a wireless wide area network (WWAN) connection to a GPRS network (not shown). The GPRS adapter may include a subscriber identity module (SIM) for authentication purpose. For one embodiment, the computer system 100 may also include a short range wireless device (not shown) to support short range communication with other devices using a short range wireless standard. One example of such short-range wireless standard is Bluetooth published by the Bluetooth Special Interest Group (SIG). Other examples of short-range wireless standards include HiperLan, HiperLan II, HomeRF, OpenAir, etc.

Operating States of the Computer System

Figure 2:
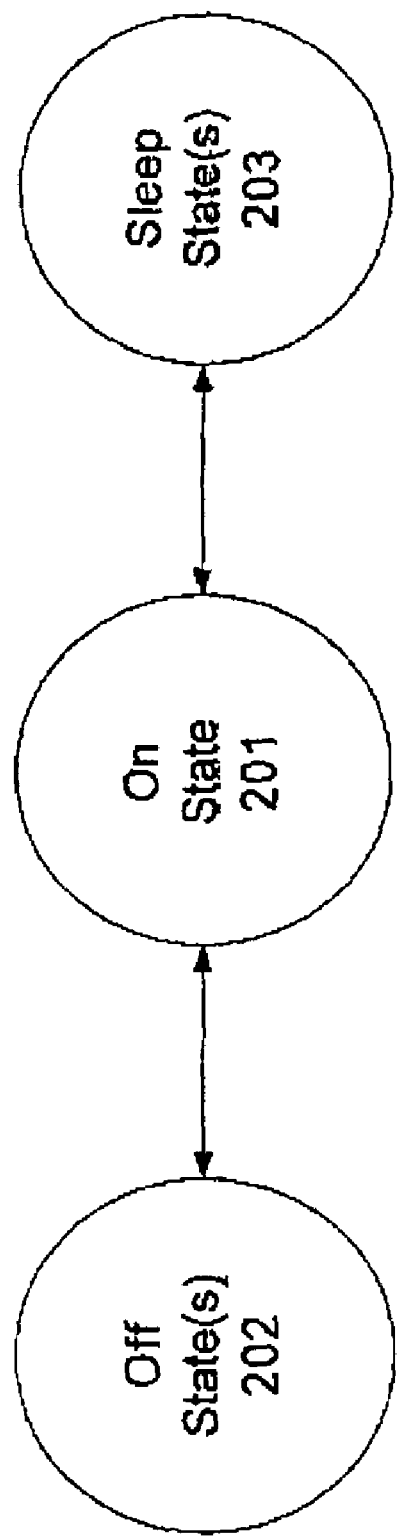
FIG. 2 illustrates examples of different operating states for a mobile computer system, according to one embodiment.

FIG. 2 illustrates examples of different operating states for a mobile computer system, according to one embodiment. An embodiment of the operating states may be found in the Advanced Configuration and Power Interface (ACPI) specification, Revision 2.0a dated Mar. 31, 2002 (and published by Compaq Computer Corporation, Intel Corporation, Microsoft Corporation, Phoenix Technologies Ltd., and Toshiba Corporation). Although the ACPI specification is recognized as describing a large number of existing computer systems, it may be noted that large numbers of computer systems that do not conform to the ACPI specification may still conform to the operating state configuration illustrated in FIG. 2. As such, the description of FIG. 2 may correspond to a more generic description that the ACPI specification conforms to.

The operating states may include an "on" state 201, which may be the normal operating state of the computer system 100. The normal operating state may be a state when the computer system 100 is actively powered, even though the computer system 100 may or may not be actively used by a user. The ACPI specification refers to the "on" state 201 as the "G0" state. During the "on" state 201, the computer system 100 may be viewed as consuming the most power because most or all of its components are also active and consuming power.

The operating states of the computer system 100 may also include one or more "sleep" states 203. While in the "sleep" states 203, the computer system 100 may consume less power than while in the "on" state 201. For example, to enter one of the "sleep" states 203, the operating environment of the computer system 100 may be saved beforehand. This operating environment may be referred to as "context". Subsequently, when the computer system returns to the "on" state 201 from the "sleep" states 203, the saved context is restored.

The ACPI specification recognizes multiple sleep states, notably the "S1", "S2", "S3" and "S4" states, each having its own respective balance between power savings and delay when returning to the "on" state 201. The S1, S2 and S3 states may be referred to as "standby" states and the S4 state may be referred to as a "hibernate" state. For example, in one "sleep" state, the CPU 102 may be able to process instructions while other components in the computer system 100 may be powered down to reduce power consumption. Moreover, although functional, the CPU 102 may be configured to operate in a mode that consumes less power. For example, the clock speed of CPU 102 may be configured to a lower frequency than a normal frequency. For one embodiment, while the computer system 100 is in the "sleep" state, the network adapters may remain powered on and operational. This may enable the computer system 100 to continue to communicate with a network. For another embodiment, the computer system 100 may be in one of the "sleep" states 203 while it is in the "closed-lid" mode. This may enable the computer system 100 to be mobile while maintaining the same context.

The operating states may also include one or more "off" states 202. During the "off" states 202, the computer system 100 may consume the least power comparing to the "on" state 201 and the "sleep" states 203. The ACPI specification recognizes two such "off" states. A first "off" state is a hardware-based "off" state where power has been entirely removed from the computer system 100. A second state "off" state is a software-based "off" state where power is provided to the computer system 100 but the basic input output system (BIOS) and operating system (OS) have to be reloaded from scratch without reference to a stored context of a previous operating environment. The ACPI specification refers to the hardware-based "off" state as a "G3" state and the software-based "off" state as a "G2" state.

In the "off" states 202, the CPU 102 may be powered down. Additionally, other major components in the computer system 100 may also be powered down. The "off" states 202 may be associated with the least amount of power consumption, but it may also be associated with getting the least amount of work done. In contrast, the "on" state 201 may be the state where the CPU 102 may perform the most useful work. Thus, there may be a trade off between productivity and power consumption when placing the computer system 100 in the "on" state 201 or in the "off" states 202. For one embodiment, when the computer system 100 is in one of the "sleep" states 203, some useful work may be achieved.

Portable Device with Secondary Display

FIG. 3A illustrates one example of a mobile computer system having a secondary display coupled to a portable device, according to one embodiment. In this example, the computer system 100 may be a mobile computer system such as a laptop or note book computer system although other forms of mobile computer system may also be applicable. The computer system 100 in this example is illustrated as being in a "closed-lid" mode. The closed-lid mode may be associated with the computer system 100 being in one of the "sleep" states 203 or one of the "off" states 202.

The computer system 100 may include a portable device 300. The portable device 300 may include a display 305, which may be referred to herein as a secondary display 305 to distinguish it from the display 130 normally associated with the computer system 100. This display 130 may be referred to herein as a primary display 130. The secondary display 305 may be a touch screen display. The secondary display 305 may be a color, normally black, or normally white display. The secondary display 305 may be LCD, OLED, plasma, or a display implemented using other display technologies. The secondary display 305 may generally be smaller than the primary display 130.

For one embodiment, the portable device 300 may also include one or more navigation keys 310 to navigate information displayed on the secondary display 305. The navigation keys 310 may include a combination of one or more jog dials, buttons, switches, etc.

Note that although the portable device 300 is illustrated in FIG. 3A as being near one edge of the computer system 100, one skilled in the art may recognize that the portable device 300 may be detached from the computer system 100 from the illustrated location and re-attached to the computer system 100 at another location such as, for example, toward a middle location 315 or against a side edge 320.

Figure 3C:
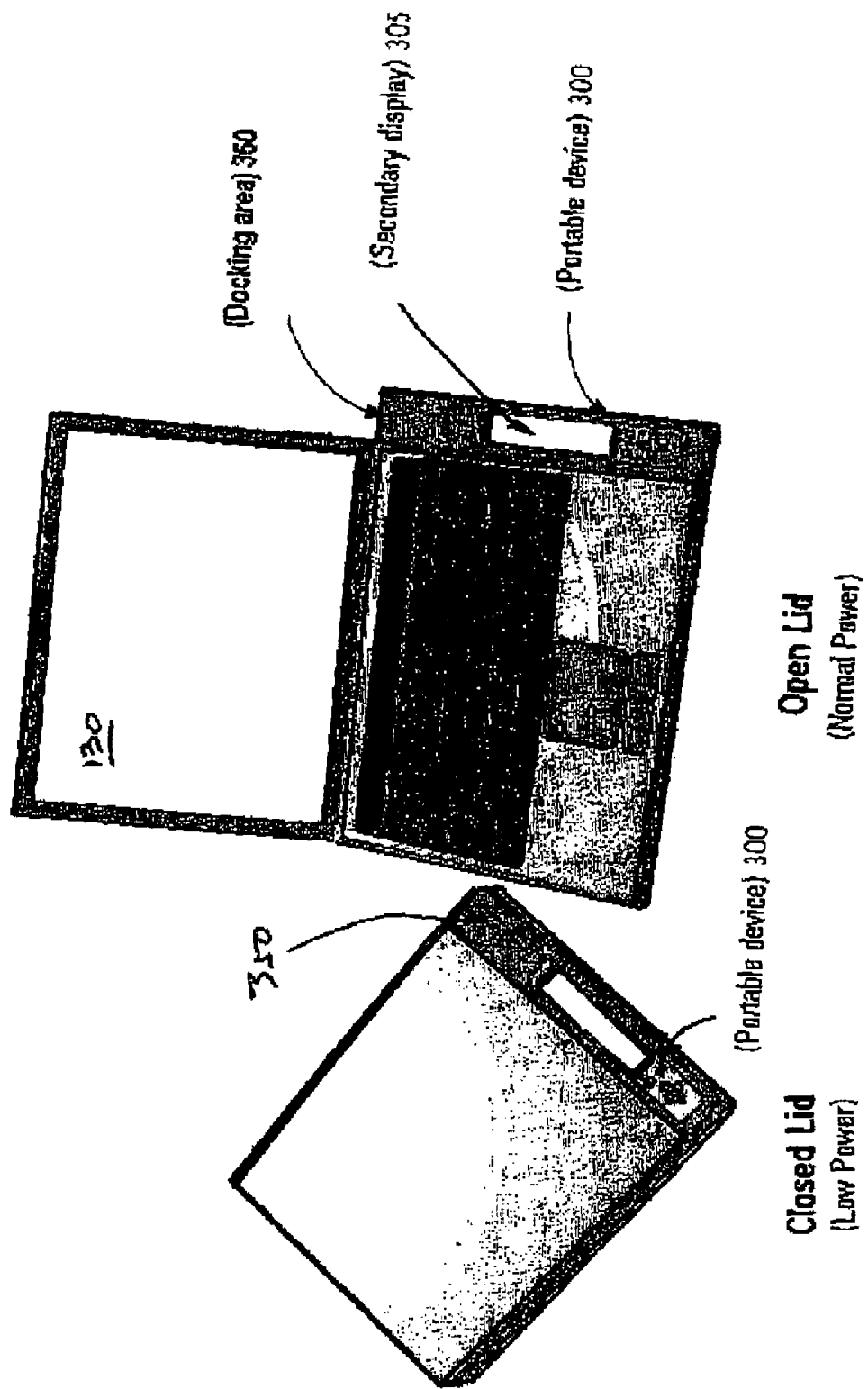
FIG. 3C illustrates another example of a mobile computer system having a secondary display included in a portable device, according to one embodiment.

FIG. 3C illustrates another example of a mobile computer system having a secondary display included in a portable device, according to one embodiment. In this example, the portable device 300 may be attached to the computer system at a docking area 350 that may be extended from the computer system 100. The thickness of the docking area 350 and the thickness of the portable device 300 may be designed such that together they may equal the thickness of the computer system 100.

Referring to FIG. 3B, for one embodiment, the lid 355 of the computer system 100 may include a slot 360. The slot 360 may be designed to allow it to accept the portable device 300 in its entirety when the computer system 100 is in the closed-lid mode. For one embodiment, the slot 360 may be a see-through slot. This may allow the slot 360 to accept the portable device 300 entirely, and it may also allow the lid 355 to be opened or closed with the portable device 300 staying relatively stationary.

For one embodiment, when the computer system 100 is in an "open-lid" mode, the computer system 100 may display information on the primary display 130 while the portable device 300 may display information on the secondary display 305. It may be noted that the information displayed on the primary display 130 may or may not be related to the information displayed on the secondary display 305.

For one embodiment, the portable device 300 may be sufficiently thin such that when it is inserted into the slot 360 while the computer system 100 is in the closed-lid mode, the outer surface of the lid 355 may remain flat. This may help protecting the portable device 300 from being damaged when the outer side of the lid 355 is placed on a surface.

For one embodiment, the outer skin of the computer system 100 and the outer skin of the portable device 300 may be made of material that enables the portable device 300 to be easily attached to the computer system 100. One skilled in the art may recognize that any other attachment mechanisms may also be used to enable the portable device 300 to be easily attached to or detached from the computer system 100.

Figure 4:
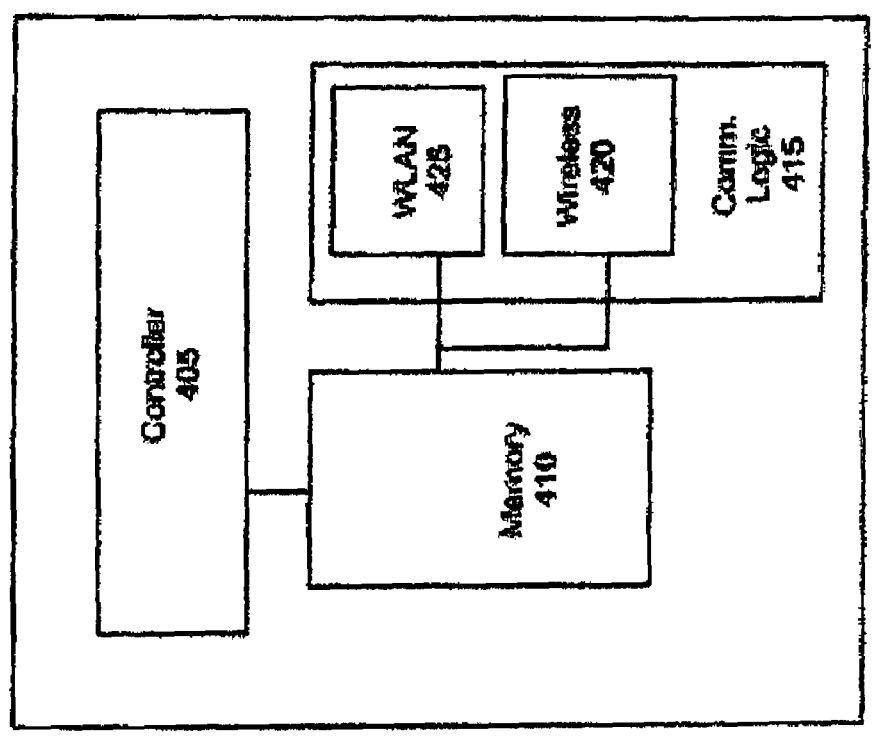
FIG. 4 illustrates one example of the portable device, according to one embodiment.

FIG. 4 illustrates one example of the portable device, according to one embodiment. For one embodiment, the portable device 300 may include a controller (or processor) 405 and memory 410 to enable the portable device 300 to process information to be displayed on the secondary display 305. The memory 410 may be a combination of flash memory and other type of memories. The portable device 300 may also include communication logic 415 and to communicate with the computer system 100 and/or with other devices (not shown). The portable device 300 may receive power from a direct current (DC) power source (not shown) such as, for example, a battery. It may be noted that because the portable device 300 includes less features (e.g., smaller display, etc.) than the computer system 100, the portable device 300 may consume less power than the computer system 100.

Figure 5:
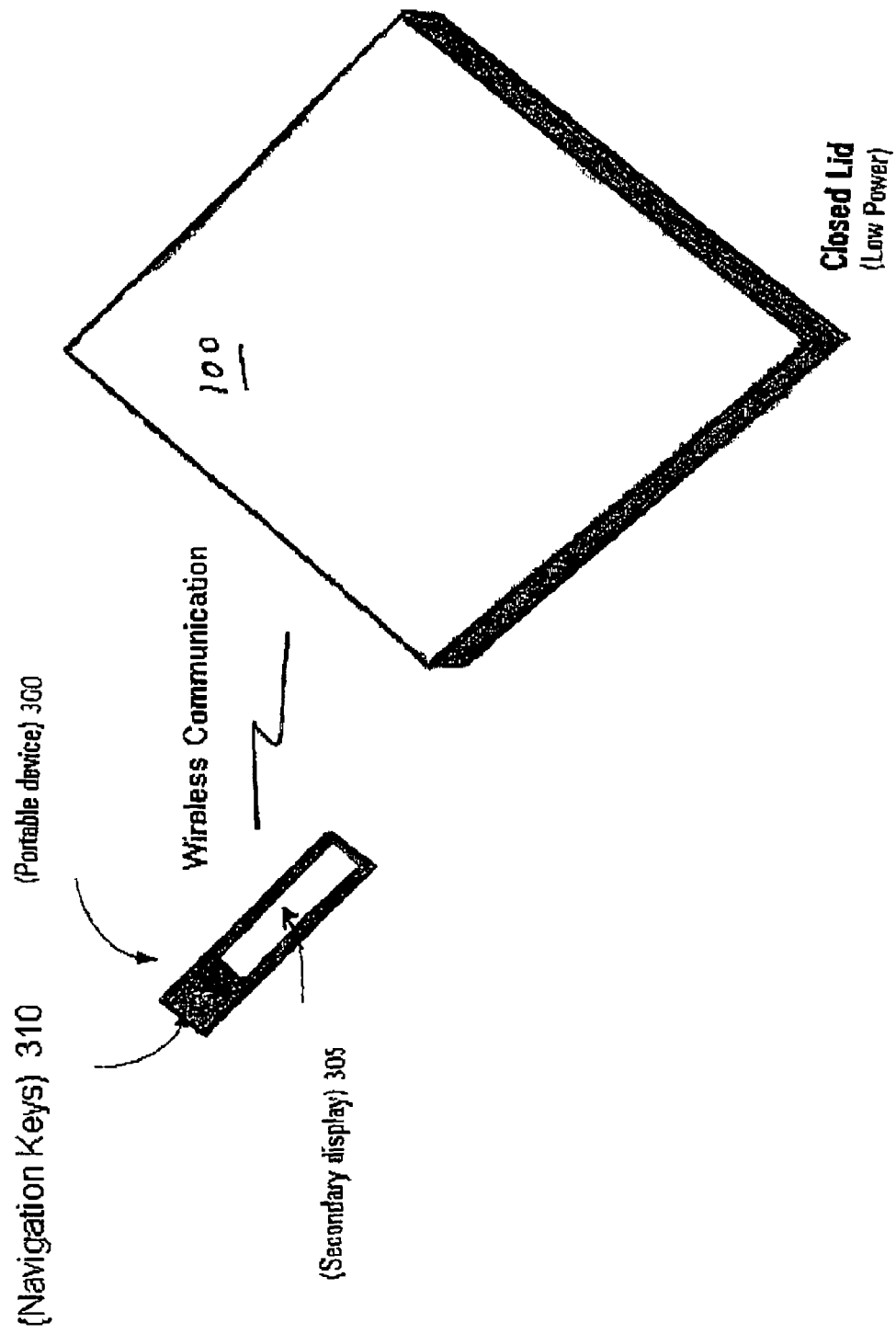
FIG. 5 illustrates an example of a portable device coupled to but detached from a mobile computer system, according to one embodiment.

The communication logic 415 may include a wireless device 420 to support short range communication using a short range wireless standard such as, for example, Bluetooth. For example, the portable device 300 may use the short range wireless device 420 to communicate with the computer system 100 when the portable device 300 is attached to the computer system 100, or when the portable device 300 is detached and within a short distance (e.g., 10 meters) from the computer system 100, as illustrated in FIG. 5. For example, a user may be holding the portable device 300 and read information displayed on the secondary display 305 while the computer system 100 is in a closed-lid mode inside a carrying bag.

For one embodiment, the communication logic 415 may also include other communication devices such as, for example, a WLAN module 425, and/or a WWAN module and a SIM (not shown). Although not shown, the portable device 300 may also include an antenna and other logic such as, for example, display logic to control information displayed on the secondary display 305.

Figure 6C:
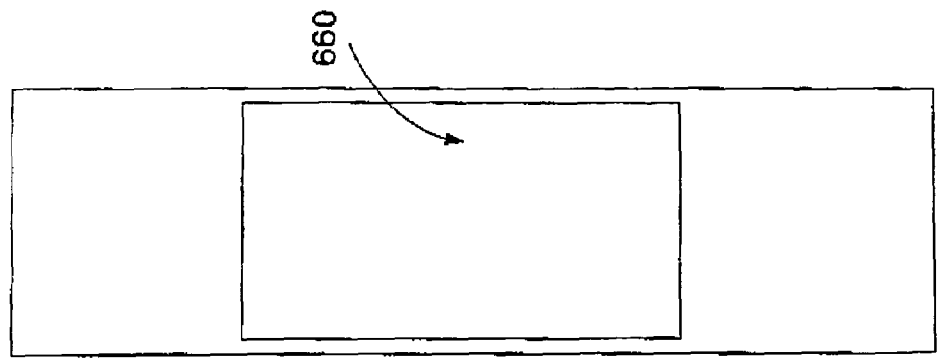
FIG. 6C illustrates one example of a portable device having a touch sensitive input pad, according to one embodiment.
Figure 6B:
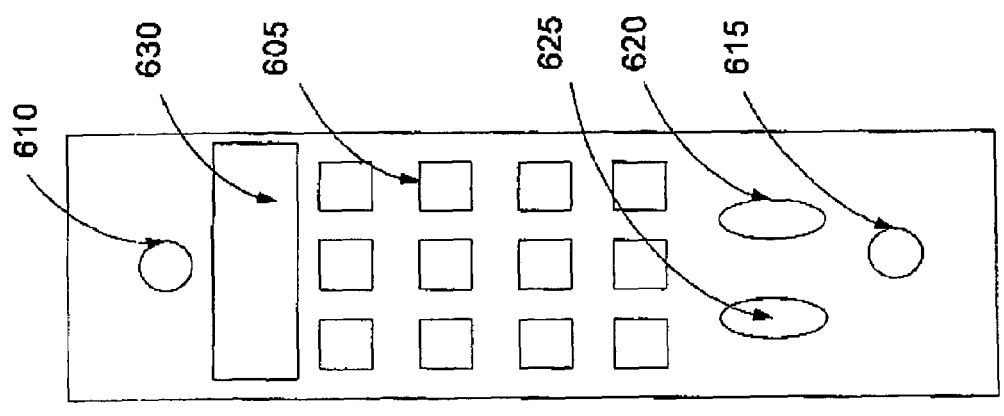
FIG. 6B illustrates one example of one side of a portable device, according to one embodiment.
Figure 6A:
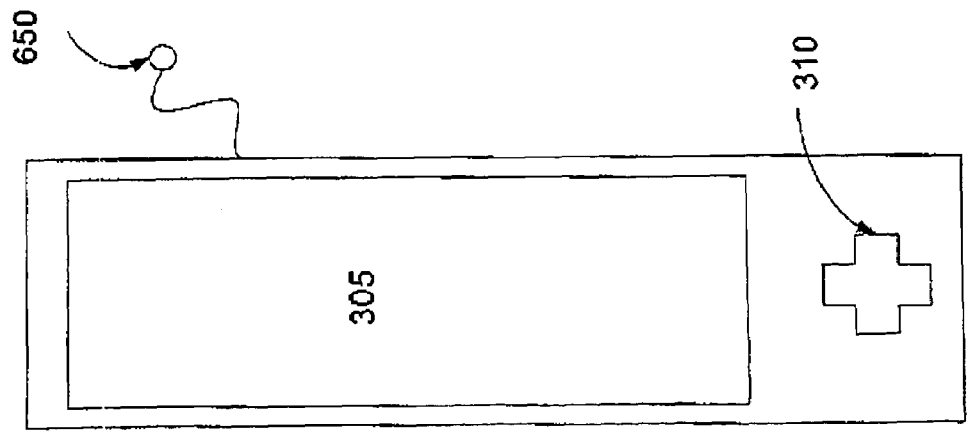
FIG. 6A illustrates one example of one side of a portable device, according to one embodiment.

FIG. 6A illustrates one example of one side of a portable device, according to one embodiment. As described in FIG. 3, the portable device 300 may include the display 305 and navigation keys 310. For one embodiment, as illustrated in an example in FIG. 6B, the portable device 300 may also include logic that supports alphanumeric keys 605. The memory 410 of the portable device 300 (as illustrated in FIG. 4) may include application software that when processed by the controller 405 may enable the portable device to perform as a personal digital assistant (PDA). Although FIG. 6B illustrates the alphanumeric keys 605 to be on a different side from the secondary display 305, for another embodiment, all of the external features of the portable device 300 may be on the same side as the secondary display 305.

For one embodiment, while the computer system 100 is in one of its "sleep" states 203, the one or more network adapters of the computer system 100 may remain active and may continue to communicate with one or more networks. For example, the short range network adapter of the computer system 100 may be used to communicate with the short range wireless device 420 of the portable device 300. This may allow the computer system 100 to send and receive information to and from the portable device 300. This may be advantageous because information available in the computer system 100 may be displayed on the secondary display 305 of the portable device 300 while the computer system 100 may still be in the closed-lid mode.

For one embodiment, the portable device 300 may also include a speaker 630 and a connector (not shown) to connect a head phone 650. One example of getting information from the computer system 100 when the computer system 100 is in the closed-lid mode may include retrieving MP3 (Motion Picture Expert Group, audio layer 3) music stored in the memory 115 of the computer system 100. A list of MP3 songs may be retrieved by the portable device 300 via the short range communication channel established between the computer system 100 and the portable device 300. The list of MP3 songs may then be displayed on the secondary display 305. The user may then select a song to be played by the computer system 100, and via the short range communication channel, the user may be able to listen to the MP3 music using the speaker 630 or the head phone 650. Other applications using the configuration described may include being able to display updated electronic messages (email), calendar appointments, maps, directions, etc. on the secondary display 305. This may enable the computer system 100 to be more productive while being in the closed-lid mode and in one of the "sleep" states 203. Being in the "closed-lid" mode may include not having to power on the primary display 130. This may significantly contribute to reducing the power consumption of the computer system 100.

Referring to FIG. 6B, the portable device 300 may also include telephony logic (not shown) that, along with the alphanumeric keys 605, may enable the portable device 300 to operate as a telephone handset. The telephony logic may include logic to support functions of a transmitter (or mouth piece or microphone) 615, a receiver (or ear piece) 610, radio frequency chip (not shown), etc. The receiver 610 may also be used as a speaker when the speaker 630 is not available. Telephony logic is known to one skilled in the art. For example, a user may use the portable device 300 to make telephone calls via the short range communication channel established between the portable device 300 and the computer system 100. In this configuration, the computer system 100 may need to be connected to the Internet, and a session may need to be established between the computer system 100 and a computer system of another person that the user wishes to establish a conversation with.

The transmitter 615 of the portable device 300 may also be used to enable the portable device 300 to receive voice commands. This may be useful to dictate documents that are subsequently converted from analog format to digital format (e.g., voice to text). The conversation may be performed by logic included in the computer system 100. Other keys that may also be included in the portable device 300 are, for example, send key 620, end key 625, and power on/off key (not shown).

FIG. 6C illustrates one example of a portable device having a touch sensitive input pad, according to one embodiment. For one embodiment, instead of having the alphanumeric keys 605, the portable device 300 may include a touch pad 660 such as, for example, a touch pad used in a personal digital assistant (PDA). A stylus (not shown) may be used with the touch pad 660 to enter information. The portable device 300 may include software (not shown) that displays alphanumeric keys similar to the alphanumeric keys 605 on the touch pad 660. The software may also accept commands issued by the user using the stylus and the touch pad 660. For one embodiment, the software may also include hand writing recognition logic to allow a user to enter information (e.g., notes, etc.) using the touch pad 660 and the stylus. Alternatively, the hand writing recognition logic may reside in the computer system 100. For one embodiment, the touch pad 660 and the secondary display 305 may be on the same side of the portable device 300.

Figure 7:
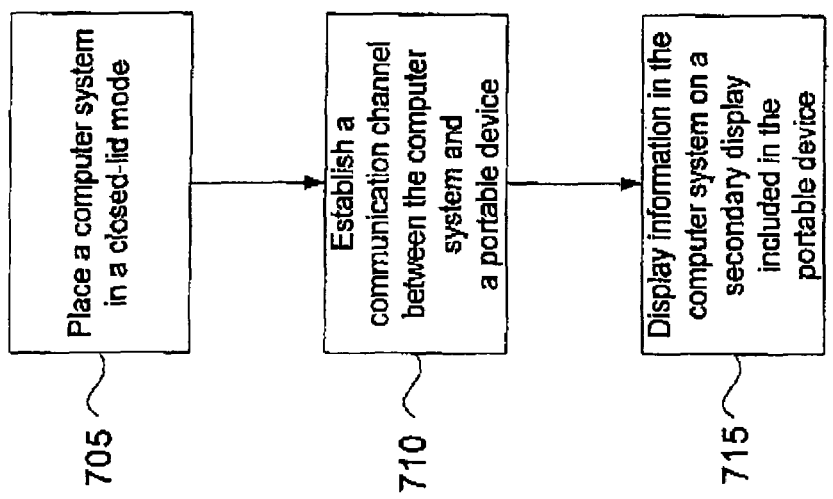
FIG. 7 is a flow diagram illustrating an example of a process of using a computer system having a secondary display, according to one embodiment.

FIG. 7 is a flow diagram illustrating an example of a process of using a computer system having a secondary display, according to one embodiment. As described above, the secondary display 304 is coupled to a portable device 300. At block 705, the computer system 100 is placed in the closed-lid mode. At block 710, a short range communication channel is established between the portable device 300 and the computer system 100. At block 715, information in the computer system 100 is displayed on the secondary display 304. It may be noted that the information displayed on the secondary display 304 may be based on commands issued by a user from the portable device. Alternatively, the information displayed on the secondary display 304 may be displayed automatically based on predetermined configurations or settings.

Methods and apparatus of using a secondary display to communicate with a mobile computer system have been disclosed. The secondary display provides an alternative approach to interface with the computer system while reducing the power consumption of the computer system.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:

using a portable device to communicate with a computer system having a lid portion and a base portion, the lid portion including a primary display, the portable device including a secondary display, wherein the portable device is to communicate with the computer system using wireless communication when the computer system is in either a normal power mode or a low power mode, wherein the portable device is in receive information from the computer system and to display the information on the secondary display.

2. The method of claim 1, wherein the information in the computer system is displayed on the secondary display when the primary display is powered off.

3. The method of claim 1, wherein the information in the computer system is displayed on the secondary display when the primary display is powered on.

4. The method of claim 1, wherein the wireless communication is based on Bluetooth protocol.

5. The method of claim 1, wherein the portable device is to communicate with the computer system using the wireless communication when it is attached to or detached from the computer system.

6. A computer system, comprising:

a memory; and a primary display coupled to the memory and a secondary display coupled to the primary display, wherein the secondary display is included in a portable device coupled to the computer system, wherein the secondary display is to display information transmitted from the computer system to the portable device using a wireless communication protocol when the portable device is attached to or detached from the computer system.

7. The computer system of claim 6, further comprising:

a wireless communication module to communicate with the portable device using the wireless communication protocol.

8. The computer system of claim 7, wherein the wireless communication module is a Bluetooth module.

9. The computer system of claim 8, wherein the information displayed on the secondary display includes information stored in the memory.

10. The computer system of claim 9, wherein the information is displayed on the secondary display when the computer system is in a low power state or in a closed-lid mode.

11. A portable device, comprising:

a processor;

a wireless communication module coupled to the processor; and a secondary display coupled to the processor, wherein the secondary display is to display information received from a detached computer system via the wireless communication module when the computer system is in a low power state, the computer system including a primary display.

12. The portable device of claim 11, wherein the primary display of the computer system is powered off when the information received from the computer system is displayed on the secondary display.

13. The portable device claim 11, further comprising alphanumeric logic and directional logic to manipulate information displayed on the secondary display.

14. The portable device of claim 11, further comprising telephony logic coupled with the alphanumeric logic, wherein the telephonic logics is to facilitate telephone conversations via the wireless communication module and the computer system.

15. The portable device claim 11, further comprising a speaker and a microphone.

16. The portable device of claim 11, further comprising a touch pad area to accept input using a stylus.

17. The portable device claim 11, wherein one or more commands are sent to the computer system via the wireless communication module to control information received from the computer system.

18. The portable device of claim 17, wherein the wireless communication module is a Bluetooth communication module.

* * * * *